United States Patent [19]

Lemmon

[11] 4,193,737
[45] Mar. 18, 1980

[54] FISH PUMP

[76] Inventor: George H. Lemmon, Rte. 1, Box 218, Hagerman, Id. 83332

[21] Appl. No.: 835,677

[22] Filed: Sep. 22, 1977

[51] Int. Cl.² ............................................. F04D 1/02
[52] U.S. Cl. .................................... 415/73; 415/206; 415/215; 43/6.5; 406/99
[58] Field of Search ..................... 415/72, 73, 88, 215, 415/206; 43/6.5; 406/99

[56] References Cited

U.S. PATENT DOCUMENTS

| | | | |
|---|---|---|---|
| 314,489 | 3/1885 | Thiery | 415/73 X |
| 605,888 | 6/1898 | Maginot | 415/215 |
| 1,020,382 | 3/1912 | Alpha | 416/177 |
| 1,361,691 | 12/1920 | Davis | 43/6.5 |
| 1,849,127 | 3/1932 | Wood | 415/213 R |
| 2,396,305 | 3/1946 | Toft | 406/99 X |
| 2,655,868 | 10/1953 | Lindau et al. | 415/213 R X |
| 2,887,958 | 5/1959 | Davidson | 415/72 X |
| 2,997,345 | 8/1961 | Stahle | 415/213 R X |
| 3,130,679 | 4/1964 | Sence | 415/206 X |
| 3,156,190 | 11/1964 | Stahle | 415/72 |
| 3,295,456 | 1/1967 | Warren | 415/206 X |
| 3,314,184 | 4/1967 | Lerch | 43/6.5 |
| 3,421,245 | 1/1969 | Lerch | 43/6.5 |
| 3,606,567 | 9/1971 | Stahle | 414/47 |
| 3,768,193 | 10/1973 | London | 43/6.5 |
| 3,771,900 | 11/1973 | Baehr | 415/72 |
| 3,809,491 | 5/1974 | Banyai | 415/73 X |
| 3,940,867 | 3/1976 | Sikich | 43/6.5 |

FOREIGN PATENT DOCUMENTS

| | | | |
|---|---|---|---|
| 232869 | 4/1964 | Austria | 415/215 |
| 574079 | 12/1945 | United Kingdom | 415/206 |
| 588962 | 1/1978 | U.S.S.R. | 43/6.5 |

*Primary Examiner*—Leonard E. Smith
*Attorney, Agent, or Firm*—Wells, St. John & Roberts

[57] ABSTRACT

A fish pump is described for pumping live fish in water from one location to another. The pump is designed specifically for pumping live fish without injuring the fish. Of special significance is the pump rotor. It includes symmetrical helical-spiral passages that lead from a single open axial intake to peripheral open outlets at an enlarged rotor discharge end. The passages are open only at the intake and outlets and are smoothly curved to prevent damage to the fish. The passages and all other areas through which the fish pass are of cross-sectional dimension that is at least equal to one half the length of the longest fish to be pumped. Furthermore, the pitch of the helical-spiral passageways varies from the rotor opening to the outlet to influence the pumping efficiency without endangering the fish. The rotor, when in operation, produces a vortex at its intake end that tends to align the fish with the axis of rotation of the pump rotor. The fish will therefore enter the rotor passages easily and will not be injured by the rotor edges. To further minimize damage, the rotor is provided with an axial recess that spans the open intake.

1 Claim, 6 Drawing Figures

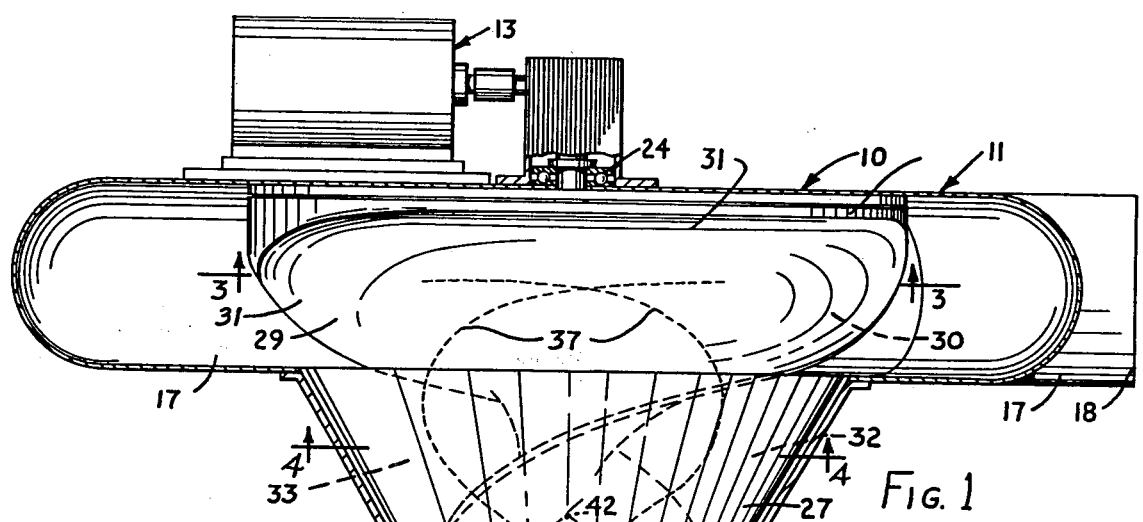
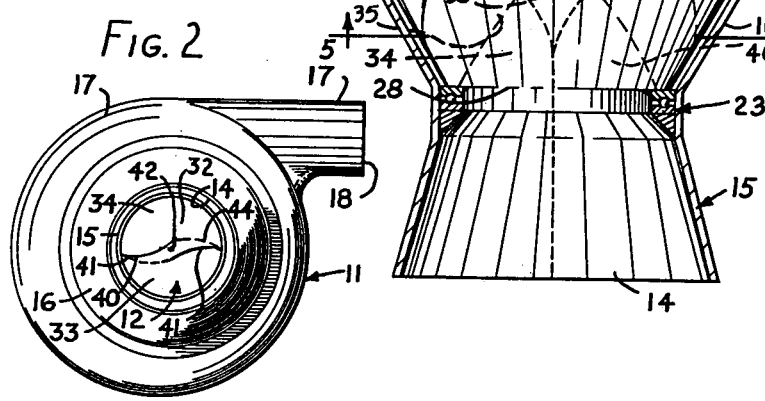
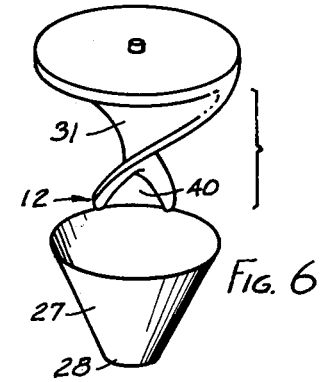
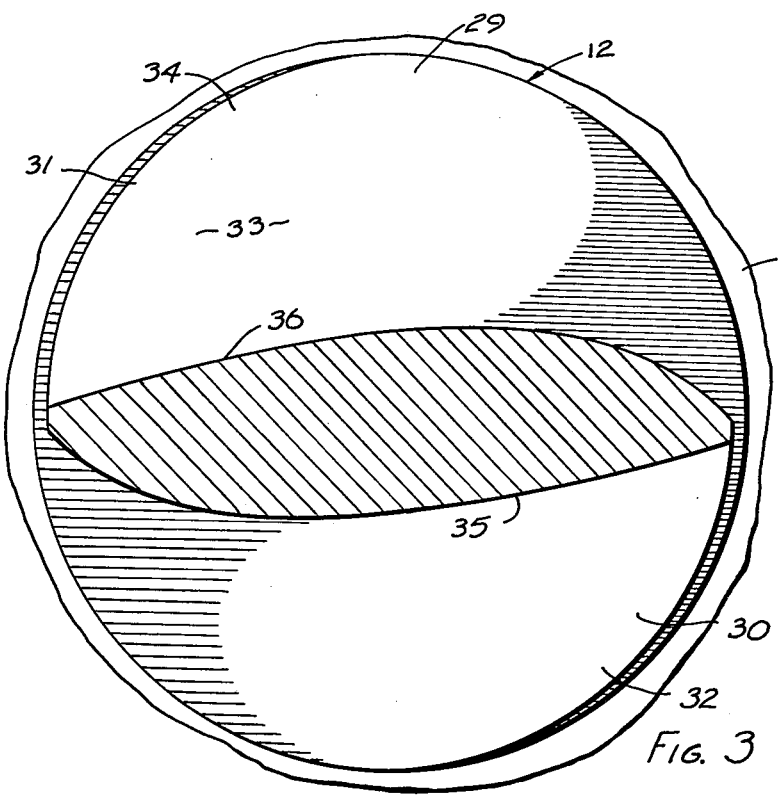

FISH PUMP

BACKGROUND OF THE INVENTION

The present invention is related to the field of apparatus for pumping live fish from one location to another.

In the fish growing industry, it is necessary to transfer live fish from holding tanks or ponds into live carrying tanks on transport vehicles. This process usually involves lifting the fish from the tanks upward to carrying tanks which are usually provided on specially designed trucks. The process has, in the past, been performed by workers with nets. This is a relatively safe manner in transferring the fish. Relatively few fish are injured by the net or in transfer from the net to the holding tank; however, efficiency is lost in manpower since it usually takes several workers several hours to load a single truck. It therefore becomes desirable to obtain some form of pump that will move live fish from their stationary holding tanks or ponds to the tanks on transport vehicles in an efficient manner with minimal injury to the fish.

Apparatus for pumping fish is not new per se. Fish pumps have been utilized in the salt water industry for some time. However, the pumps utilized there are not usually designed to prevent damage to the fish being pumped since it is unnecessary that the fish remain alive until they reach their destination point. When fresh water fish such as trout are harvested, it is very desirable to keep the fish alive until they reach their destination to keep the meat as fresh as possible.

It is a first object of the present invention to provide a fish pump that will operate efficiently in pumping fish in water from one location to another without injuring the fish either by battering against the rotor or by bending the fish to an overall length that is less than half the straightened length of the fish.

Another object is to provide such a pump that makes use of a mixed flow form of rotor wherein both axial and centrifugal force components are imparted to the fluid moving through the pump whereby a somewhat greater "head" may be realized at a relatively low rpm.

A still further object is to provide such a pump that includes a mixed flow rotor designed such that a vortex is formed upstream of the rotor during operation to initiate alignment of the fish before they enter through the rotor passages. By so aligning the fish, there is considerably less chance that the fish will be struck by the edges of the rotor.

Various other objects and advantages will become apparent upon reading the following description which, when taken with the accompanying drawings, describe a preferred form of my invention. It is to be noted, however, that the following description and drawings are given merely to set forth a preferred form of the invention and that alterations may be made within the scope of the appended claims. Therefore, only the claims are to be taken as specific definitions of what I claim to be my invention.

BRIEF DESCRIPTION OF THE DRAWINGS

FIG. 1 is a vertical sectional view through a pump casing to illustrate the mixed flow rotor of the present invention;

FIG. 2 is a reduced bottom plan view of the present pump;

FIG. 3 is a sectional view taken along line 3—3 in FIG. 1;

FIG. 6 is an isometric exploded view of the rotor showing an exterior skin removed to illustrate rotor passageways.

DETAILED DESCRIPTION OF A PREFERRED EMBODIMENT

Figure 4:
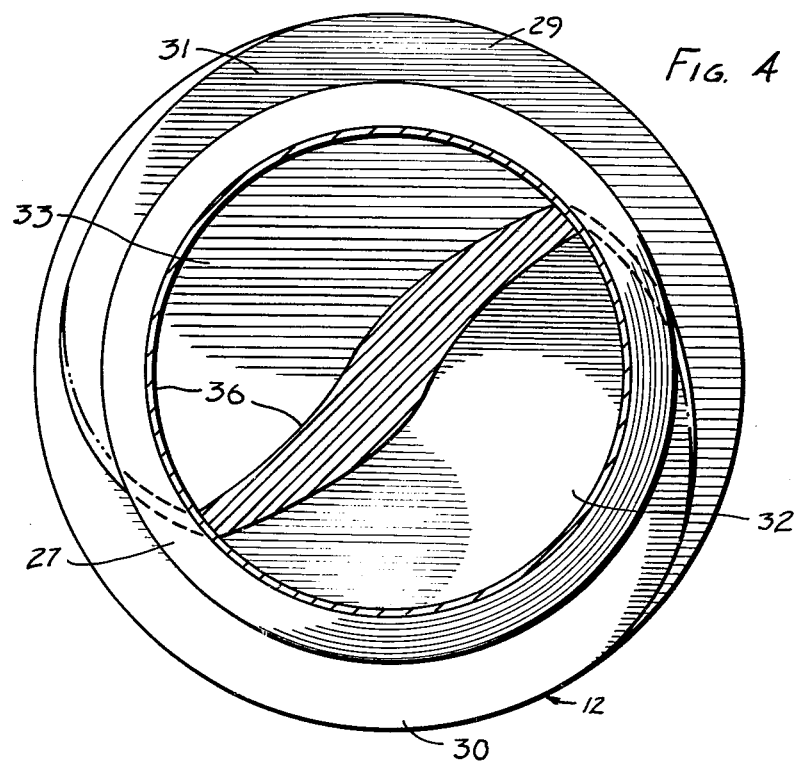
FIG. 4 is a sectional view of the rotor removed from the remainder of the pump taken substantially along a plane as indicated at 4—4 in FIG. 1.

A preferred form of the present fish pump is illustrated in the accompanying drawings and is designated therein by the reference character 10. Basically, the fish pump 10 includes a pump casing 11 that is stationary and rotatably houses a mixed flow rotor 12. The rotor 12 is rotated within the casing 11 about a longitudinal axis through an appropriate drive means 13. The pump 10 includes an intake opening 14 at a forward end of the casing 11. The opening 14 is defined by a conical intake casing section 15. Directly adjoining the intake section 15 is a frusto-conical section 16 that houses the rotatable rotor 12. Section 16 is joined to a volute section 17 of the casing 11. The volute section 17 leads to a discharge opening 18. The discharge opening 18 is situated within a plane that is transverse to the longitudinal axis of the rotor 12 and intake opening 14. Preferably, the axis of opening 18 is perpendicular to the longitudinal rotor axis.

The rotor 12 is mounted within the casing 11 slightly inward of the intake opening 14. It is rotatably carried within the casing 11 by bearing means 23 and 24. Bearing means 23, 24 situate the rotor 12 within the casing 11 such that the rotational axis of the rotor is coaxial with the axis of the intake opening 14.

The rotor 12 itself has axially spaced intake and discharge ends that are situated between the intake and discharge openings of the casing 11. Therefore, a fish entering the pump 10 will first pass through the pump intake opening 14, then through the intake of the rotor 12 to be directed both axially and radially through the rotor to its discharge end and finally radially outwardly through the volute section 17 to the discharge opening 18.

The rotor 12 is rotatably carried within casing 11 within the frusto-conical section 16 between the intake opening and discharge opening 17 and 18. Rotor 12 includes an integral frusto-conical peripheral skin 27 that is complementary to the inside wall of the section 16.

The rotor 12 leads from a reduced rotor intake end 28 rearward and outwardly to an enlarged discharge end 29. The reduced rotor intake end 28 is situated somewhat downstream of the intake opening 14 while the enlarged discharge end 29 is located adjacent the discharge opening 18. The intake end 28 is centered coaxially on the longitudinal axis of the casing intake opening 14 and rotational axis of the rotor. Fluid flowing through the rotor 12 is substantially axial at the intake end 28. The flow is then progressively converted into a substantial radial flow at the enlarged discharge end 29. It may therefore be understood that a fish can enter the pump through the intake opening 14 while moving substantially axially in relation to the rotor axis. The direction of the fish changes as the fish passes through the rotor to a somewhat radial orientation as the fish reaches the rotor discharge end 29 and enters into the volute section 17. The flow also has an angular component about the rotational axis directed ultimately to the discharge opening 18 through which the fish and water pass under pressure from the rotating rotor.

The enlarged discharge end 29 of the rotor 12 has two symmetrical peripheral openings 30 and 31. The peripheral openings 30, 31 feed from the rotor 12 into the volute section 17 of casing 11. The axial dimensions of the openings 30 and 31 are equal and are substantially equal to the inside cross-sectional dimension of the volute section 17. The peripheral openings 30 and 31 are found at the downstream ends of a pair of helical-spiral passages 32 and 33 respectively. The passages are open ended, extending through the rotor housing from the peripheral openings 30 and 31 upstream to merge at a single opening 34 at the rotor intake end 28. The passages 32 and 33 are defined by enclosed walls 35 and 36 that are open only at the defined openings 30, 31 and 34. Walls 35, 36 may be semi-circular or circular in cross section depending on the mode of construction of the rotor. The passages however are formed completely symmetrical about the central rotational axis as may be evidenced in FIG. 1 by the dashed lines 37. These lines represent the theoretical center for helical-spiral axes of the passages and substantially define the paths taken by fish as they progress through the pump intake 14 and rotor 12.

The relative pitch of the spiral passages 32 and 33 are best illustrated with reference to the FIG. 1 and dashed lines 37. As shown, the pitch in the axial direction decreases from infinity at the reduced intake end 28 to almost zero at the enlarged rotor end 29. More specifically, the pitch of the passages 32, 33 diminishes along a curve in the form of a cycloid. In other words, a graph representing the pitch angle with respect to longitudinal position along the central rotational axis would produce a cycloidal curve. This curvature produces the effect of the passages being substantially axial at the intake through the single opening 34 then dividing and increasingly spreading radially as they progress rearwardly or downstream to the substantially radial peripheral openings 30 and 31.

Although two passages 32, 33 are shown, additional passages could be utilized if they are arranged symmetrically about the axis.

Figure 5:
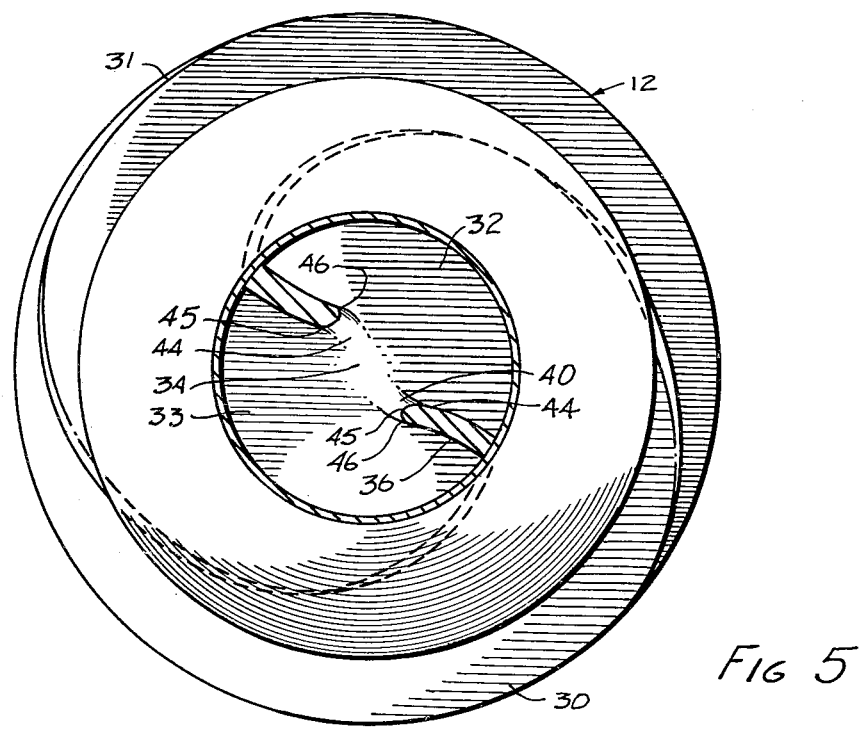
FIG. 5 is a sectional view of the rotor removed from the remainder of the pump taken substantially along a plane as indicated at 5—5 in FIG. 1.

The passage walls 35 and 36 converge at the single opening 34, forming a substantially axial recess 40. Recess 40 is best seen in dashed lines in FIG. 1. It is also shown in FIG. 2 and in section in FIG. 5. The recess 40 is composed of converging edges 41 that come together on the longitudinal axis at an apex 42. The converging edges 41 extend symmetrically outward and forward from the apex 42. As seen in FIG. 5, each edge 41 includes a smooth curved surface 44 at a leading side 45. An abrupt trailing edge 46 adjoins each leading edge. The smooth curved surfaces 44 face the intended direction of rotation for rotor and the trailing edges 46 follow. The surface 44 directed the fish into one or the other of the passages 32 or 33. The edges 41 tend to lead the fish into the rotor rather than allowing the fish to hang up on the edges and become damaged.

It has been found that the abrupt trailing edges 46 serve to produce a turbulence within the fluid flowing through the pump that extends slightly upstream of the rotor. The turbulence will take the shape of a vortex that will exist within the tubular intake section 15. This is an advantage because the vortex will tend to align the fish with the central rotational axis of the rotor and also begin rotating the fish about that axis so that it will at least be partially synchronized with the movement of the rotor prior to its entry through the reduced rotor intake end.

Another feature of my invention is the design of the pump so that a fish cannot be doubled over to an overall length of less than half its length. It is known that internal injuries will result if a fish is bent to a length less than one half its original length. Therefore, the casing intake opening 14, rotor opening 34, passages 32 and 33, volute sections 17 and discharge opening 18 are of cross-sectional diameters equal to or greater than one half the length of the longest fish intended to be pumped. Furthermore, the angular curvature of the passages 32 and 33 about the axis are such that there is not a radius at any point that is less than one fourth the length of the longest fish to be pumped. Therefore, fish may move substantially axially into the rotor and exit in a substantially radial direction without being bent to a length less than one half their original straightened length.

In operation, the drive means 13 is operated to rotate the rotor 12 in a direction such that both the water and fish will be lifted or pulled toward the discharge opening 18 from the intake opening 14. A single fish entering into the intake opening 14 will first experience the vortex created by the rotor between the intake opening 14 and the rotor intake opening 34. As the fish is drawn closer to the rotor intake, the fish movement will somewhat synchronize with the rotation of the rotor due to the effect of the vortex. Therefore, the smooth curved surfaces 44 have little opportunity for striking and damaging the fish. Even if the surfaces 44 do engage the fish, they will not do so in a chopping fashion but will engage and deflect the fish further into one of the passages 32, 33 and out of engagement with the surface 44. The vortex also serves the function of aligning the fish along the longitudinal axis of the rotor. Therefore, the fish will most probably enter the rotor head-first and pass lengthwise through one of the two passages 32 or 33.

The fish progresses longitudinally through the passage and is guided to a more radial orientation. Finally, the fish will leave the rotor through one of the peripheral openings 30 or 31 while moving in a radial-tangential direction. The volute section 17 receives the fish discharged from the rotor and guides it in a volute path toward the casing discharge opening 18. From the opening 18, the fish may pass through an attached hose or tube (not shown) to an adjacent container.

In actual practice, at an operational speed of approximately 500 rpm, I have been able to lift fish in water over a vertical distance of sixteen feet. I have found the effect of the helical-spiral passages 32, 33 and the gradually changing pitch produces both axial and centrifugal flow components to the fish and water. Axial flow is initiated as the fish enter the passageways through the single rotor opening 34. The gradual curvature of the passages change the orientation of the fish from axial to substantially radial and thereby add the centrifugal force component to the already axially moving fish. The result is an efficient pumping effect, taking advantage of both axial and centrifugal flow without damaging the fish either by bruising or by bending. Even if a fish should by chance turn transverse to the casing inlet 14, rotor inlet opening 34, passages 32 and 33, volute section 17, or discharge opening 18, no excessive bending will occur since the cross-sectional dimensions of those areas are greater than one half the length of the longest fish intended to be pumped.

As noted above, this description was given merely by way of example to set forth the preferred form of my invention. Only the following claims are to be taken as specific definitions of my invention.

What I claim is:

1. A fish pump for pumping live fish having a known maximum length, comprising:

a hollow casing having a forward end with an intake opening centered on a pump longitudinal axis and a rear end with an enlarged unobstructed angular volute channel formed therein communicating with a tangential discharge opening;

a mixed flow rotor mounted within the casing for rotation about the longitudinal axis in a desired angular direction, said rotor having an intake end adjacent the intake opening of the casing and a discharge end projecting into the rear end of the casing;

said rotor having at least two fish passageways formed therein that are symmetrical with respect to the longitudinal axis and are merged at the rotor intake end coaxially along the longitudinal axis to form an unobstructed recessed, axially-extending, inlet opening communicating with the casing intake opening to initially receive the fish therein in a substantially axial orientation as the rotor is rotated;

wherein the rotor inlet opening has axially extending leading edges that extend from a periphery of the rotor inlet opening rearward and radially inward to an apex along the longitudinal axis in which the apex is axially spaced along the longitudinal axis from the annular volute channel;

wherein the axially extending leading edges have smooth curved surfaces facing the direction of rotation of the rotor to guide the fish from the recessed rotor inlet opening into the fish passageways;

said fish passageways extending axially rearward and diverging radially outward through the rotor to tangentially directed, peripheral exit openings that progressively merge into the annular volute opening;

wherein the minimum cross-sectional dimensions of the rotor inlet opening, the rotor passageways and the rotor exit openings in conjunction with the annular volute channel are at least equal to one-half the known maximum fish length; and wherein each of the fish passageways extends axially and radially in a helical-spiral path about the longitudinal axis in which the path has a progressively decreasing helical pitch that varies along a cycloid curve to initially receive the live fish in the axial recessed inlet opening in a substantially axial orientation and then axially and radially conveying the live fish from the inlet opening through the rotor passageway in a helical-spiral path about the longitudinal axis with the live fish progressively passing tangentially into the volute channel for tangential discharge from the pump through the tangential discharge opening.

* * * * *